United States Patent
Yi et al.

(10) Patent No.: US 9,839,043 B2
(45) Date of Patent: *Dec. 5, 2017

(54) APPARATUS AND METHOD FOR ALLOCATING RESOURCES FOR LOGICAL CHANNELS IN WIRELESS COMMUNICATION SYSTEM

(71) Applicant: LG Electronics Inc., Seoul (KR)

(72) Inventors: Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 205 days.

This patent is subject to a terminal disclaimer.

(21) Appl. No.: 14/668,475

(22) Filed: Mar. 25, 2015

(65) Prior Publication Data

US 2015/0201426 A1  Jul. 16, 2015

Related U.S. Application Data

(63) Continuation of application No. 13/929,555, filed on Jun. 27, 2013, now Pat. No. 9,019,926, which is a (Continued)

(30) Foreign Application Priority Data

Aug. 9, 2010 (KR) .................. 10-2010-0076577

(51) Int. Cl.
*H04W 72/04* (2009.01)
*H04W 72/10* (2009.01)
*H04W 72/12* (2009.01)

(52) U.S. Cl.
CPC ....... *H04W 72/10* (2013.01); *H04W 72/0413* (2013.01); *H04W 72/0453* (2013.01); *H04W 72/1247* (2013.01)

(58) Field of Classification Search
None
See application file for complete search history.

(56) References Cited

U.S. PATENT DOCUMENTS 7,936,731 B2    5/2011  Park et al.
2005/0111398 A1*  5/2005  Wybenga .......... H04W 72/0453
                                          370/328

(Continued)

FOREIGN PATENT DOCUMENTS

CN    101115231 A    1/2008
CN    101150596 A    3/2008

(Continued)

OTHER PUBLICATIONS

Motorola: "MAC-layer impacts of bandwidth aggregation", 3GPP TSG-RAN WG2 Meeting #65bis, R2-092357, Mar. 23-27, 2009.

(Continued)

*Primary Examiner* — Candal Elpenord
(74) *Attorney, Agent, or Firm* — Dentons US LLP

(57) ABSTRACT

A method and apparatus of allocating a resource for a plurality of logical channels is provided. A transmitter acquires a plurality of available resources for a plurality of component carriers, and allocates the plurality of available resources to the plurality of logical channels based on priority of each of the plurality of logical channels.

16 Claims, 16 Drawing Sheets

Related U.S. Application Data continuation of application No. 12/854,354, filed on Aug. 11, 2010, now Pat. No. 8,488,540.

(60) Provisional application No. 61/233,844, filed on Aug. 14, 2009, provisional application No. 61/233,472, filed on Aug. 12, 2009.

(56) References Cited

U.S. PATENT DOCUMENTS

| | | | |
|---|---|---|---|
| 2007/0201369 A1* | 8/2007 | Pedersen | H04L 47/2416 370/235 |
| 2007/0258433 A1* | 11/2007 | Speight | H04L 47/10 370/349 |
| 2009/0154430 A1 | 6/2009 | Guo | |
| 2009/0225711 A1 | 9/2009 | Sammour et al. | |
| 2009/0323601 A1 | 12/2009 | Wu | |
| 2009/0323842 A1 | 12/2009 | Zhang et al. | |
| 2010/0118892 A1 | 5/2010 | Nguyen et al. | |
| 2010/0272045 A1 | 10/2010 | Hsu | |
| 2010/0281486 A1* | 11/2010 | Lu | H04W 72/1247 718/104 |

FOREIGN PATENT DOCUMENTS

| | | |
|---|---|---|
| CN | 101242622 A | 8/2008 |
| JP | 2007-174310 A | 7/2007 |
| JP | 2010-519845 A | 6/2010 |
| JP | 2013-516856 A | 5/2013 |
| KR | 10-2009-0063176 A | 6/2009 |
| KR | 10-2009-0084722 A | 8/2009 |
| KR | 10-0911304 A | 8/2009 |
| WO | 2008/156275 A2 | 12/2008 |
| WO | 2011/082533 A1 | 7/2011 |

OTHER PUBLICATIONS

ZTE: "Considerations on scheduling in carrier aggregation", 3GPP TSG RAN WG2 Meeting #66bis, R2-093886, Jun. 29-Jul. 3, 2009.
LG Electronics Inc.: "Logical Channel Prioritization for Aggregated Carriers", 3GPP TSG-RAN2 Meeting #67 R2-094630, Aug. 24-28, 2009.

* cited by examiner

FIG. 10
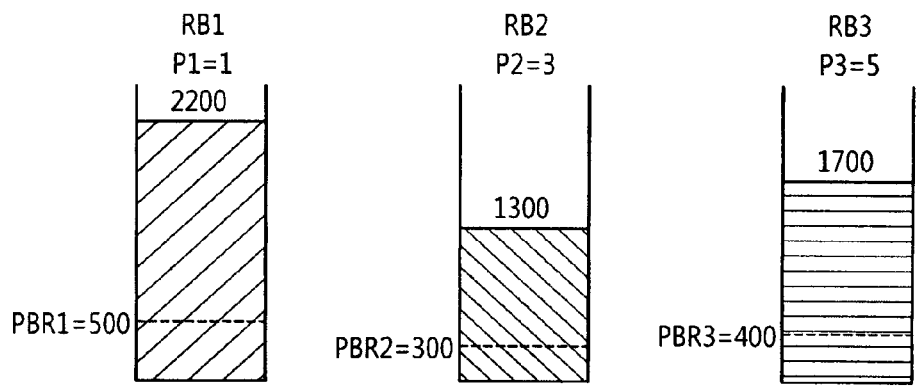
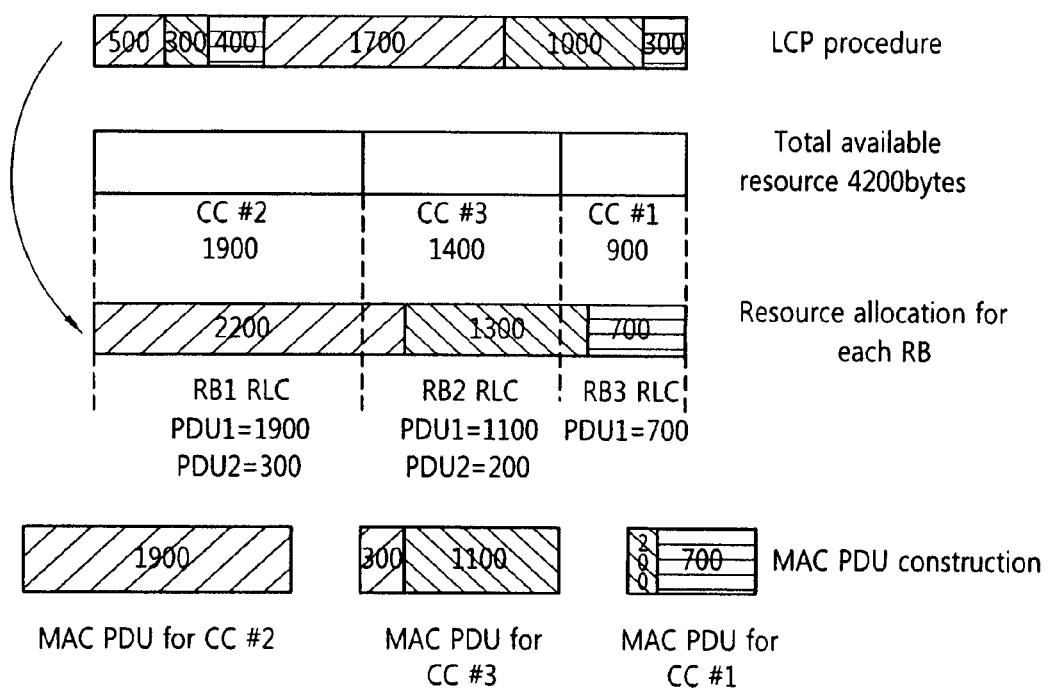

APPARATUS AND METHOD FOR ALLOCATING RESOURCES FOR LOGICAL CHANNELS IN WIRELESS COMMUNICATION SYSTEM

CROSS-REFERENCE TO RELATED APPLICATIONS

This application is a continuation of application Ser. No. 13/929,555 filed Jun. 27, 2013, which is a continuation of application Ser. No. 12/854,354, filed Aug. 11, 2010 (now U.S. Pat. No. 8,488,540), which claims priority and benefit from U.S. Provisional Application Nos. 61/233,472, filed Aug. 12, 2009; and 61/233,844, filed Aug. 14, 2009, and Korean Patent Application No.: 10-2010-0076577 filed Aug. 9, 2010, all of which are hereby incorporated by reference.

BACKGROUND OF THE INVENTION

1. Field of the Invention

The present invention relates to wireless communications, and more particularly, to a method and apparatus for allocating resources for a plurality of logical channels in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The 3GPP LTE-A employs various techniques such as carrier aggregation, relay, etc. The 3GPP LTE system is a single carrier system supporting only one bandwidth (i.e., one component carrier) among {1.4, 3, 5, 10, 15, 20} MHz. On the other hand, the LTE-A employs multiple carriers using carrier aggregation. The carrier is defined with a center frequency and a bandwidth. A multiple-carrier system uses a plurality of component carriers having a narrower bandwidth than a full bandwidth.

In the 3GPP LTE, logical channel prioritization (LCP) is a process used when a plurality of logical channels are multiplexed in one transport channel. The LCP is performed on a single uplink carrier.

How to apply the LCP to a plurality of uplink carriers is not introduced yet.

SUMMARY OF THE INVENTION

The present invention provides a method and apparatus for allocating a plurality of available resources for a plurality of component carriers to a plurality of logical channels in a wireless communication system.

In an aspect, a method of allocating a resource for a plurality of logical channels is provided. The method includes acquiring a plurality of available resources for a plurality of component carriers, and allocating the plurality of available resources to the plurality of logical channels based on priority of each of the plurality of logical channels.

The step of allocating of the plurality of available resources to the plurality of logical channels may include determining a total resource by combining the plurality of available resources, allocating the total resource to each of the plurality of logical channels based on the priority of each of the plurality of logical channels, and determining at least one logical channel corresponding to each of the plurality of component carriers from the allocated total resource.

The step of allocating of the total resource to each of the plurality of logical channels based on the priority of each of the plurality of logical channels may include allocating the total resource to a first amount of data for each of the plurality of logical channels in order of the priority of each of the plurality of logical channels, and allocating remaining resources of the total resource to a second amount of data for each of the plurality of logical channels in order of the priority of each of the plurality of logical channels.

The first amount of data for each of the plurality of logical channels may be based on a prioritized bit rate (PBR) for each of the plurality of logical channels.

The remaining resources may be equally allocated to at least two logical channels having the equal priority among the plurality of logical channels.

Each of the plurality of available resources may correspond to a medium access control (MAC) protocol data unit (PDU) transmitted through each of the plurality of component carriers.

Allocation of the total resource may be performed in a MAC layer, a resource allocated to at least one logical channel corresponding to each of the plurality of component carriers is delivered by the MAC layer to a radio link control (RLC) layer, the MAC layer acquires at least one RLC PDU for each of the plurality of component carriers from the RLC layer, and the MAC layer constructs a MAC PDU for each component carrier by multiplexing the at least one RLC PDU.

The step of allocating of the plurality of available resources to the plurality of logical channels may include allocating each of the plurality of available resources to a first amount of data for each of the plurality of logical channels in order of the priority of each of the plurality of logical channels, and allocating remaining resources among the plurality of available resources to a second amount of data for each of the plurality of logical channels in order of the priority of each of the plurality of logical channels.

The first amount of data for each of the plurality of logical channels may be based on a PBR for each of the plurality of logical channels, and each of the plurality of available resources may sequentially be allocated to the first amount of data for each of the plurality of logical channels.

The remaining resources may be resources that remain after the plurality of available resources is sequentially allocated to all the first amount of data for each of the plurality of logical channels.

The first amount of data for each of the plurality of logical channels may be based on a divided PBR acquired by dividing a PBR for each of the plurality of logical channels by the number of the plurality of component carriers.

The method may further include determining priority of each of the plurality of component carriers, wherein the plurality of available resources is allocated in order of the priority of each of the component carriers.

The plurality of available resources may be acquired from a plurality of uplink grants received from a base station.

The plurality of available resources may be used during a single transmission time interval (TTI).

In another aspect, a wireless apparatus includes a transceiver, and a processor operatively coupled to the transceiver and for allocating a resource for a plurality of logical channels, wherein the processor is configured for acquiring a plurality of available resources for a plurality of component carriers, and allocating the plurality of available resources to the plurality of logical channels based on priority of each of the plurality of logical channels.

The processor may be configured for allocating of the plurality of available resources to the plurality of logical channels by determining a total resource by combining the plurality of available resources, allocating the total resource to each of the plurality of logical channels based on the priority of each of the plurality of logical channels, and determining at least one logical channel corresponding to each of the plurality of component carriers from the allocated total resource.

The technique to allocate a plurality of available resources for a plurality of component carriers is proposed.

BRIEF DESCRIPTION OF THE DRAWINGS

FIG. 10 shows LCP according to a first embodiment.

DESCRIPTION OF EXEMPLARY EMBODIMENTS

Figure 1:
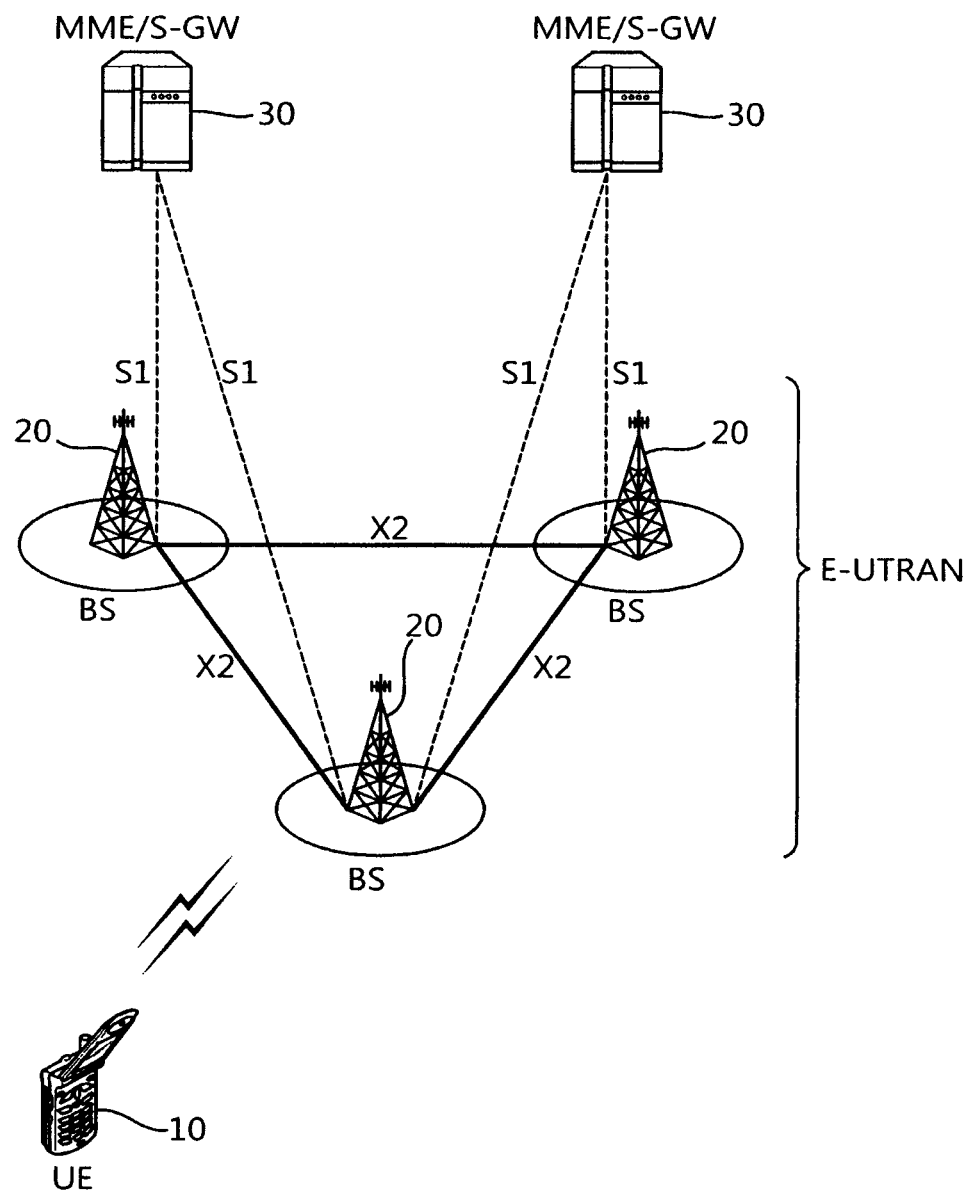
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges a RRC message between the UE and the BS.

Figure 2:
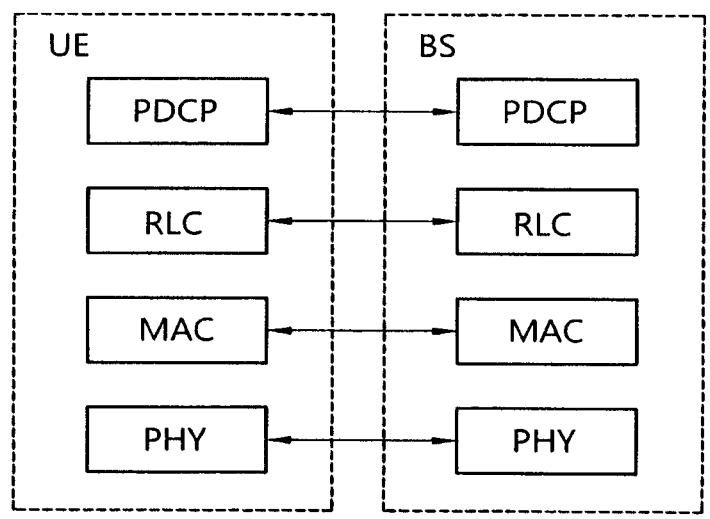
FIG. 2 is a diagram showing a radio protocol architecture for a user plane.
Figure 3:
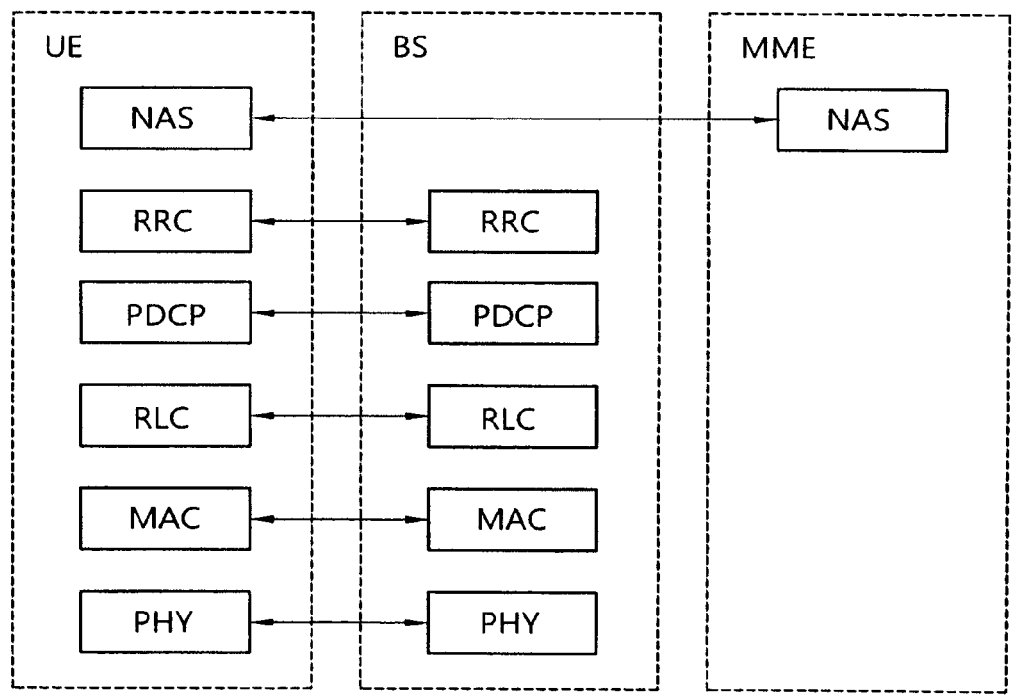
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting a RRC message in the control plane. The DRB is used as a path for transmitting user data in the user plane.

When a RRC connection exists between a RRC layer of the UE and a RRC layer of the network, the UE is in a RRC connected state, and otherwise the UE is in a RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Now, a multiple carrier system is disclosed.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 4:
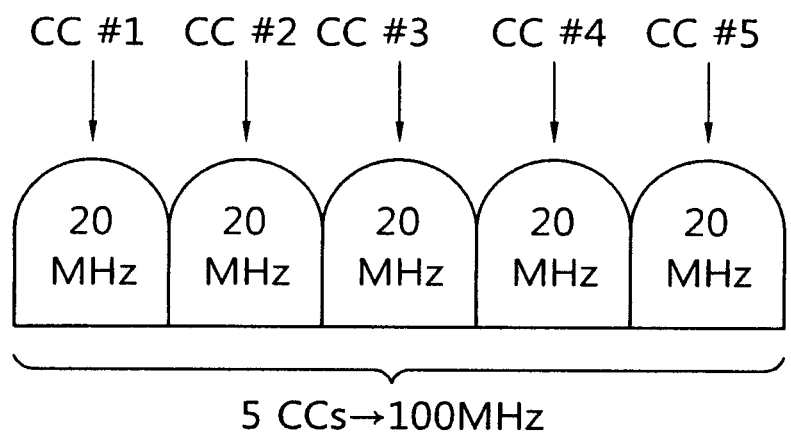
FIG. 4 shows an example of multiple carriers.

FIG. 4 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs is exemplary purposes only. Each CC may have a different bandwidth. The number of downlink CCs and the number of uplink CCs may be identical to or different from each other.

Figure 5:
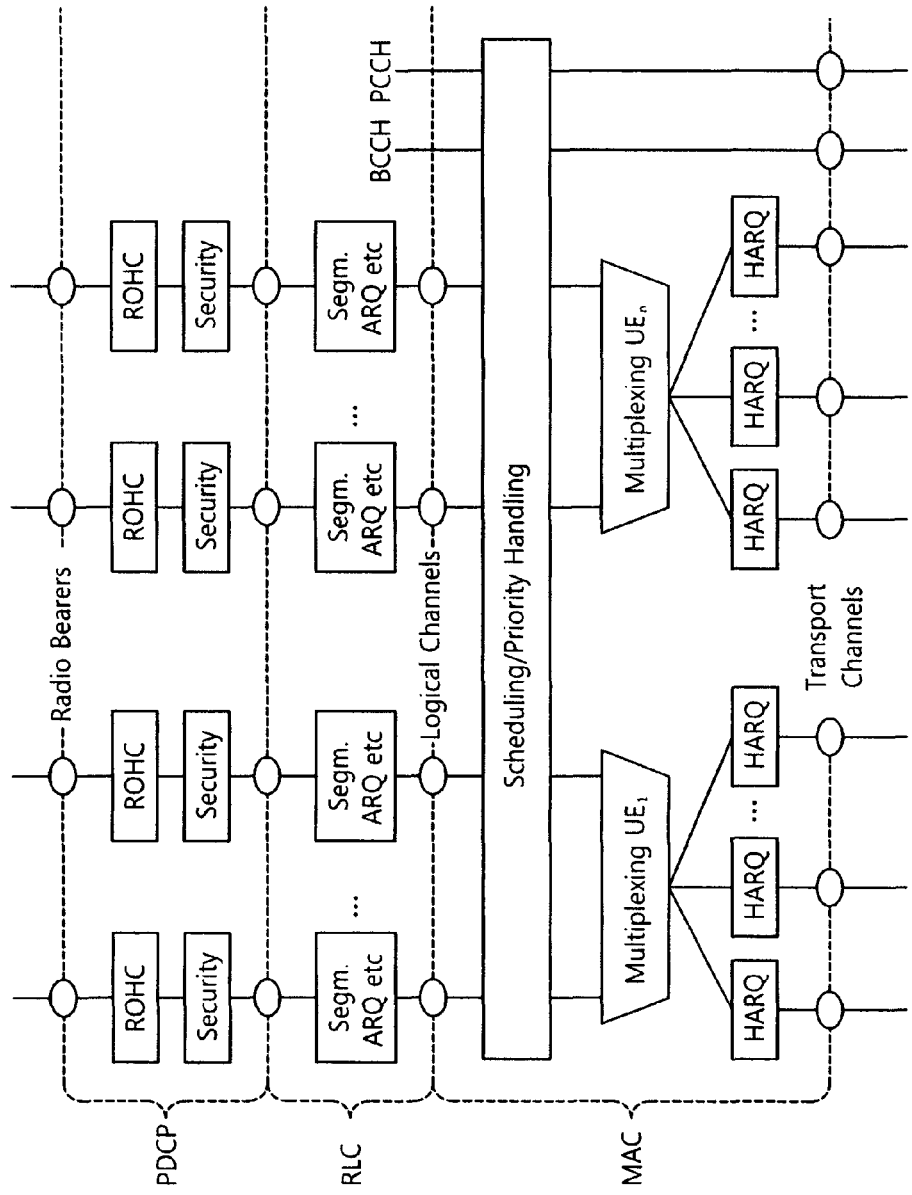
FIG. 5 shows a second-layer structure of a BS for multiple carriers.
Figure 6:
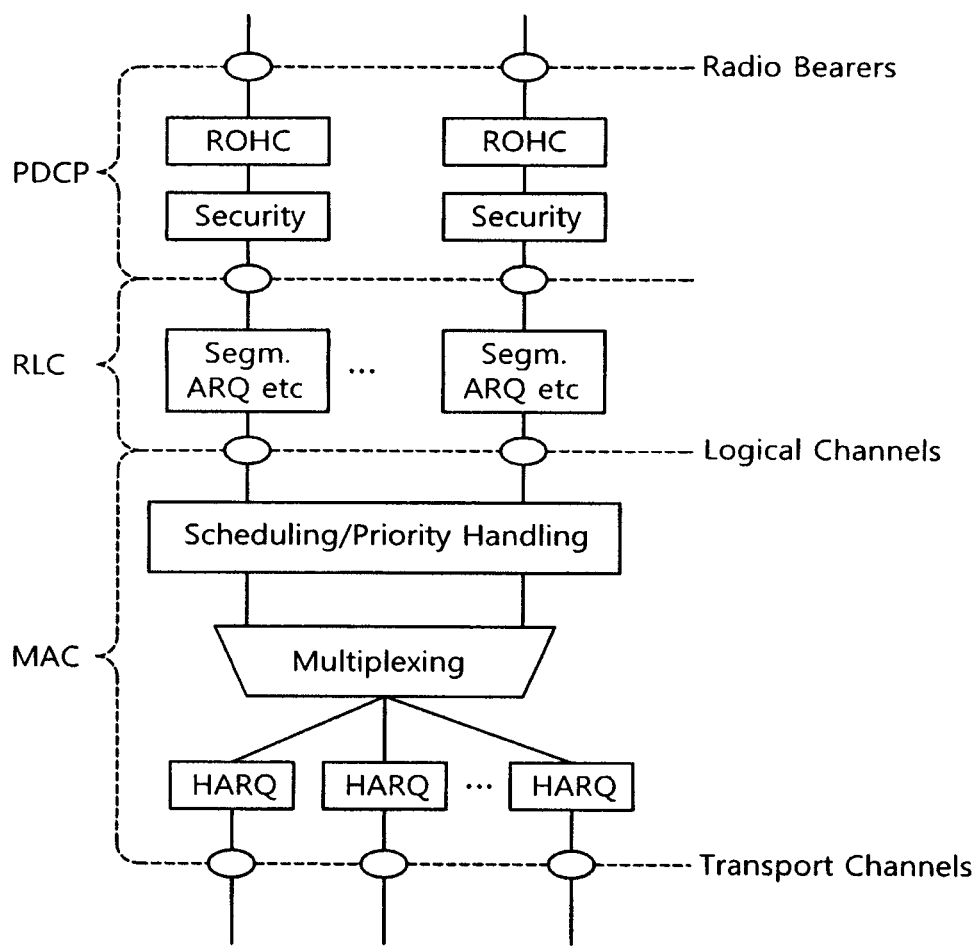
FIG. 6 shows a second-layer structure of a UE for multiple carriers.

FIG. 5 shows a second-layer structure of a BS for multiple carriers. FIG. 6 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block over a transport channel. Therefore, a plurality of HARQ entities can transmit or receive a plurality of transport blocks through a plurality of CCs.

Hereinafter, Logical Channel Prioritization (LCP) in 3GPP LTE is disclosed.

In order to provide various types of services, at least one RB may be configured. A logical channel is allocated to a RB. A plurality of logical channels corresponding to a plurality of RBs are multiplexed and transmitted through one transport channel (i.e. MAC Protocol Data Unit (PDU)).

The LCP is a method for multiplexing data of the plurality of RBs (i.e. a plurality of logical channels) into a transport block (i.e. MAC PDU). LCP determines how much amount of given radio resources are allocated to each of the plurality of RBs. The LCP is a procedure that is performed for each new transmission by a transmitter.

Each logical channel has a priority. For example, when the priority values range from 1 to 8, it is assumed that higher priority value indicates a lower priority level. Additionally, each logical channel has a prioritized bit rate (PBR). The PBR is the minimum bit rate that is guaranteed by the RB.

A priority and/or a PBR of a RB are transmitted from a RRC layer of a network to a RRC layer of an UE through a RB setup message when the RB is initially configured. The RRC layer of the UE which receives the RB setup message configures a RB and sends information on the LCP and the PBR of the RB to the MAC layer of the UE. The MAC layer that receives the information determines amounts of transmission data of the RB according to the LCP for each transmission time interval (TTI). The TTI is referred to as an interval to transmit data through one transport channel.

A MAC layer of a transmitter can determine amounts of transmission data of the RBs by using the following rules with respect to given radio resources for each transmission.

(1) Resources are allocated to amounts of transmission data in the descending order of priorities of the RBs up to a value such that the served data rate equals to the PBR for each RB.

(2) If any resources remain, serve all the logical channels in the descending order of the priorities until data for the logical channels or the remained resources are exhausted, whichever comes first.

Figure 7:
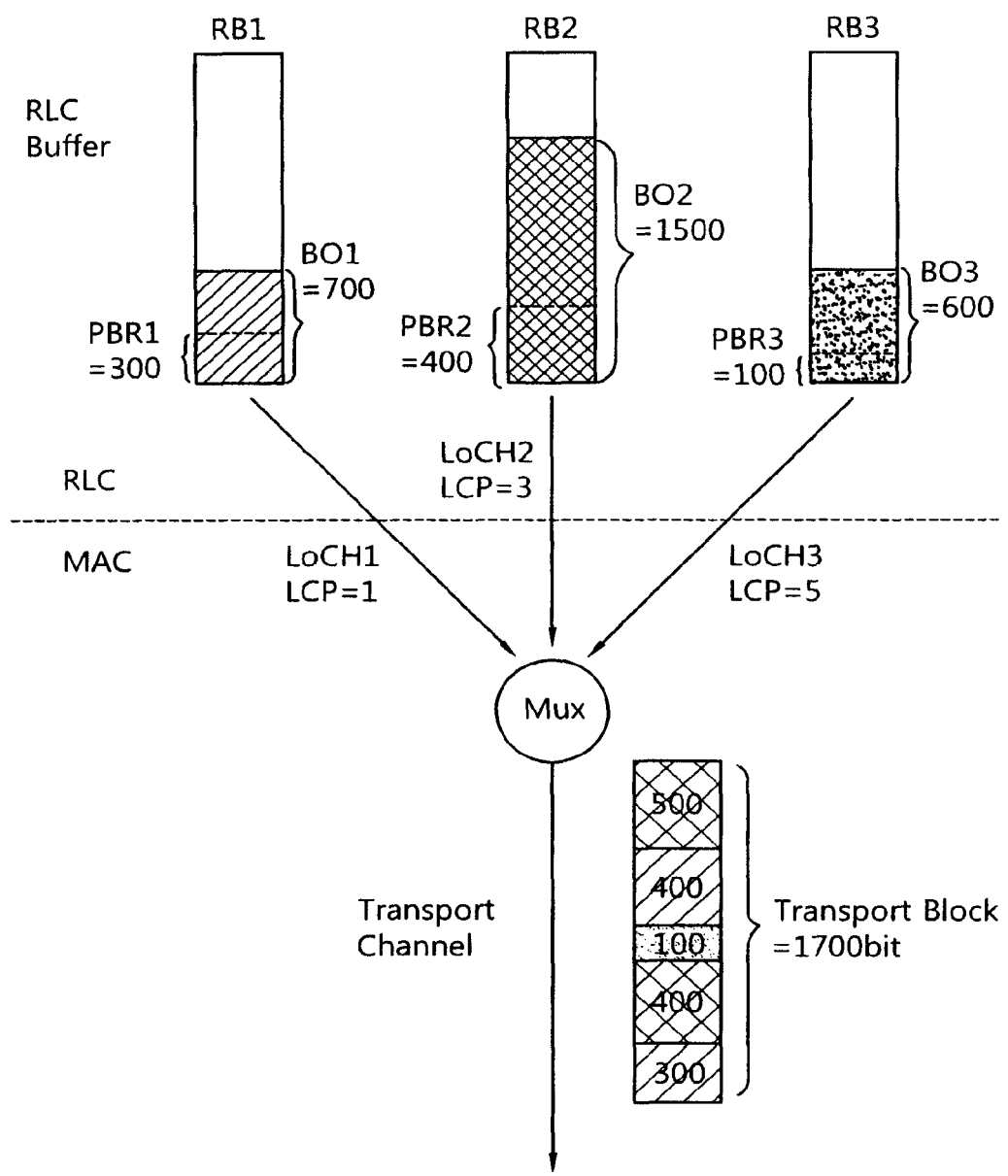
FIG. 7 illustrates an example of LCP according to a prior art.

FIG. 7 illustrates an example of LCP according to a prior art.

Three RBs RB1 to RB3 are multiplexed in one transport channel. Here, it is assumed that the priority of the RB1 is P1=1, the priority of the RB2 is P2=3, the priority of the RB3 is P3=5, PBR1 of the RB1 is 300 bit/TTI, PBR2 of the RB2 is 400 bit/TTI, and PBR3 of the RB3 is 100 bit/TTI. The size of a transport block for a transport channel is 1700 bits. The size of the transport block is the size of radio resources allocated to the transport channel and may vary for each TTI according to resource allocation (i.e. uplink grant).

A buffer occupancy BO1 of the RB1 is 700 bits, a buffer occupancy BO2 of the RB2 is 1500 bits, and a buffer occupancy BO3 of the RB3 is 600 bits. A buffer occupancy (BO) is an amount of a buffer currently occupied by data. The occupied data can be divided into data corresponding to the PBR and the other data. Hereinafter, the data corresponding to the PBR among BOs of the RBs is called as PBR data and the other data is called as remaining data.

First, the MAC layer allocates radio resources to the PBR data of RBs in the descending order of the priorities. In the example of FIG. 7, the priority level of the RB1 is the highest, and the priority level of the RB3 is the lowest. Thus, amounts of transmission data are determined in the order of RB1, RB2 and RB3, to the extent of the PBR. That is, the transport block is filled with 800 bits of PBR data in the order of the PBR1 of the RB1 of 300 bits, the PBR2 of the RB2 of 400 bits, and the PBR3 of the RB3 of 100 bits.

Next, remained resources are allocated to remaining data of the RBs in the descending order of the priorities. In the example of FIG. 7, since the amount of the data of the RBs is filled according to the PBRs is 800 bits with respect to the transport block of the 1700 bits, extra resources of 900 bits remain. Accordingly, the transport block is filled with remaining data in the descending order of the priorities. That is, all the remaining data of 400 bits of the RB1 having the highest LCP are firstly filled. Then, remaining data of the RB2 is filled with extra resources of 500 bits.

Finally, in this TTI, the determined amounts of transmission data of the RBs are RB1=700 bits, RB2=900 bits, and RB3=100 bits. The determined transmission data is carried by the one transport block.

Logical channels configured with same priority are served equally. This means that remaining resources are equally allocated to the logical channels configured with same priority.

Figure 8:
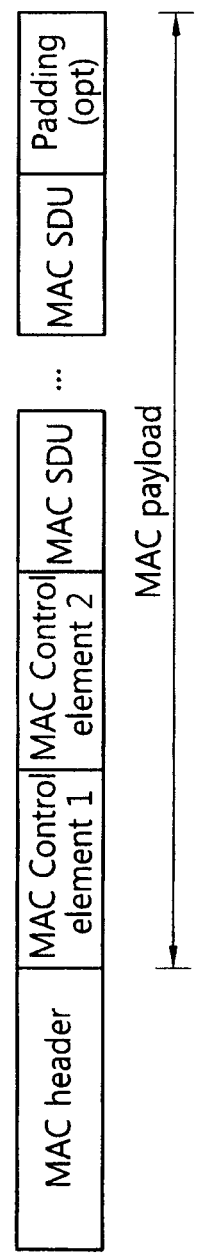
FIG. 8 shows a MAC PDU in 3GPP LTE.

FIG. 8 shows a MAC PDU in 3GPP LTE. The MAC PDU includes a MAC header, a MAC control element, and at least one MAC service data unit (SDU). The MAC header includes at least one subheader, and each subheader corresponds to the MAC control element and the MAC SDU. The subheader represents a length and property of the MAC control element and the MAC SDU. The MAC SDU is a data block provided from a higher layer of a MAC layer (e.g., an RLC layer or an RRC layer). The MAC control element is used to deliver control information of the MAC layer similarly to a buffer status report.

Hereinafter, an available resource of a CC denotes a part or the entirety of a resource that can be used for transmission of a MAC PDU of the CC. For clear explanation, a size of an available resource is expressed by the number of bits, but this is for exemplary purposes only. A size of the MAC control element included in the MAC PDU may be considered or may not be considered as the size of the available resource.

Figure 9:
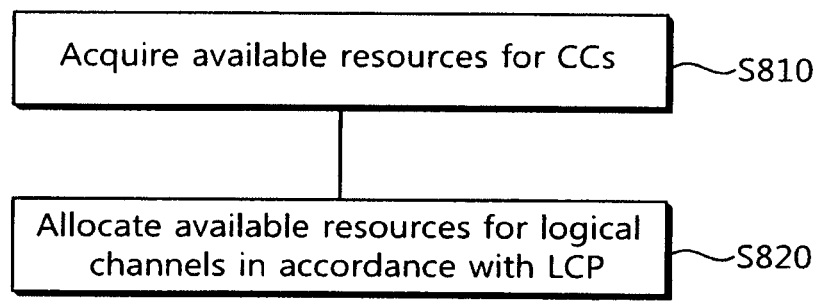
FIG. 9 is a flowchart showing a resource allocation method according to an embodiment of the present invention.

FIG. 9 is a flowchart showing a resource allocation method according to an embodiment of the present invention. This procedure can be performed by a MAC layer of a transmitter.

A plurality of available resources for a plurality of CCs are acquired (step S810). Information regarding the available resource of each CC can be included in an uplink grant transmitted on a physical downlink control channel (PDCCH) of a downlink CC.

The plurality of available resources are allocated to a plurality of logical channel in accordance with LCP (step S820). First, the plurality of available resources are allocated to a first amount of data for each of the plurality of logical channels in order of priority of each of the plurality of logical channels. The first amount of data for each of the plurality of logical channels is determined based on a PBR for each of the plurality of logical channels. Further, the remaining resources are allocated to a second amount of data for each of the plurality of logical channels in order of priority of each of the plurality of logical channels.

Now, a method of applying LCP to a plurality of CCs will be described by taking detailed examples.

Assume that there are 3 CCs, i.e., a CC #1, a CC #2, and a CC #3, and the respective CCs have corresponding RBs, e.g., an RB1, an RB2, and an RB3. The RB1 has a priority of P1=1, the RB2 has a priority of P2=3, the RB3 has a priority of P3=5. The RB1 has a PBR1 of 500 bytes, the RB2 has a PBR2 of 300 bytes, and the RB3 has a PBR3 of 400 bytes. An available resource of the CC #1 is 1900 bytes, an available resource of the CC #2 is 1400 bytes, and an available resource of the CC #3 is 900 bytes. Therefore, a total available resource is 4200 bytes.

FIG. 10 shows LCP according to a first embodiment.

First, in order to perform the LCP on a plurality of CCs, a total available resource is determined by combining a plurality of available resources.

In addition, the LCP is performed on the total available resource. 1) The total available resource is allocated to a first amount of data for each of the plurality of logical channels in the descending order of priority of each of the plurality of logical channels. 2) In addition, the remaining resources are allocated to a second amount of data for each of the plurality of logical channels in the descending order of priority of each of the logical channels.

The total available resource is 4200 bytes. First, a first amount of data corresponding to a PBR, i.e., 500 bytes of the RB1, 300 bytes of the RB2, and 400 bytes of the RB3, is allocated in the descending order of priority of the RBs. In addition, 1700 bytes of the RB1, 1000 bytes of the RB2, and 300 bytes of the RB3 are allocated to the remaining resources. Consequently, 2200 bytes are allocated to the RB1, 1300 bytes are allocated to the RB2, and 700 bytes are allocated to the RB3.

At least one logical channel corresponding to each CC is determined from the allocated total available resource. Since an RLC PDU is configured for each CC, a MAC layer reports a size of an allocated resource to an RLC layer, and the RLC layer constructs one or more RLC PDUs according to the allocated resource and sends the configured RLC PDU to the MAC layer.

The available resource of the CC #2 is 1900 bytes, and thus a MAC PDU of the CC #2 consists of an RLC PDU1 of the RB1 of 1900 bytes. The available resource of the CC #3 is 1400 bytes, and thus a MAC PDU of the CC #3 consists of an RLC PDU2 of the RB1 of 300 bytes and an RLC PDU1 of the RB2 of 1100 bytes. The available resource of the CC #1 is 900 bytes, and thus a MAC PDU of the CC #1 consists of an RLC PDU2 of the RB2 of 200 bytes and an RLC PDU1 of the RB3 of 700 bytes.

Therefore, the MAC layer requests the RLC layer of the RB1 to send two RLC PDUs (i.e., a PDU1 of 1900 bytes and a PDU2 of 300 bytes), requests the RLC layer of the RB2 to send two RLC PDUs (i.e., a PDU1 of 1100 bytes and a PDU2 of 200 bytes), and requests the RLC layer of the RB3 to send one RLC PDU (i.e., a PDU1 of 700 bytes).

After receiving the RLC PDU from all RBs, the MAC layer generates a MAC PDU for each CC, and transmits the MAC PDU by using each CC.

Figure 11:
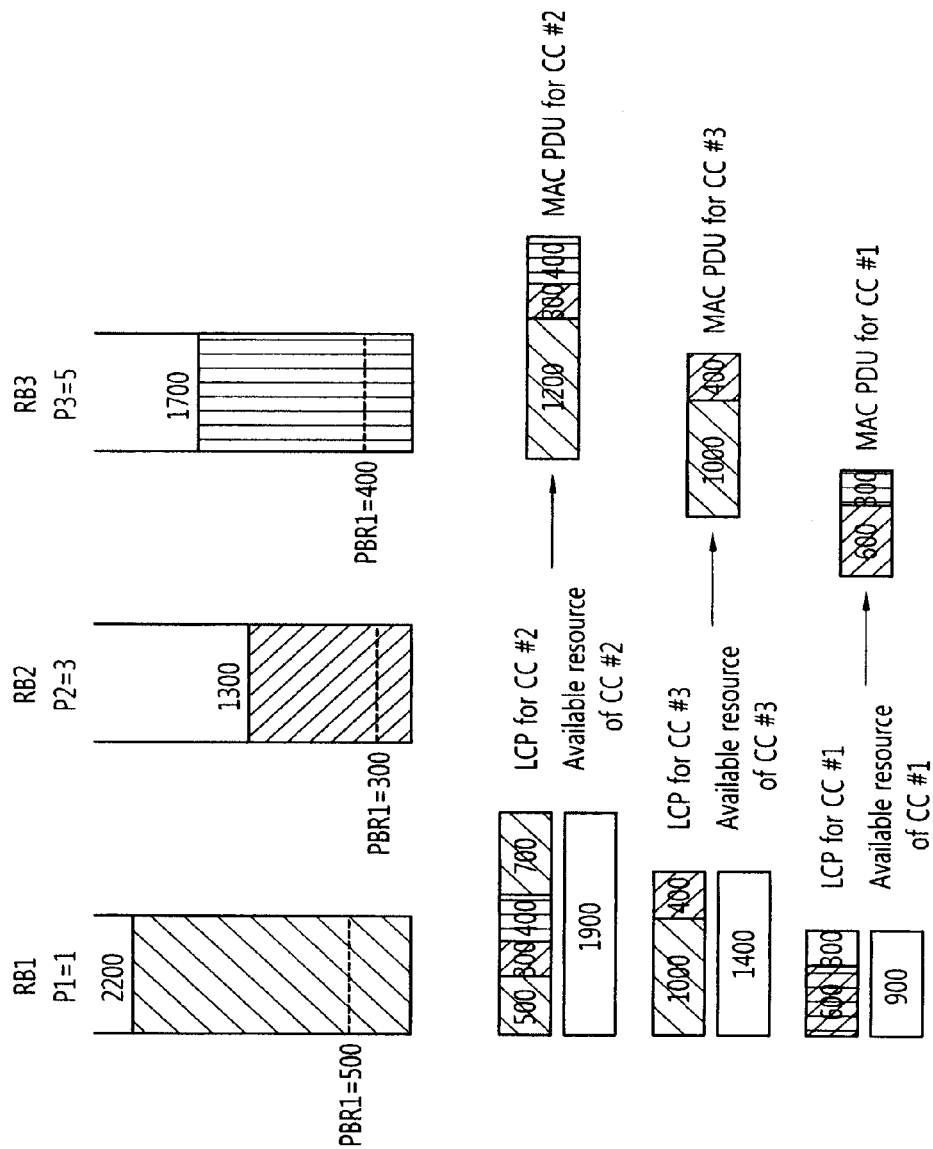
FIG. 11 shows LCP according to a second embodiment.

FIG. 11 shows LCP according to a second embodiment. Unlike the embodiment of FIG. 10 in which the LCP is performed once, the LCP is performed sequentially on a plurality of CCs. Since there are three CCs, the LCP is performed three times per TTI. However, a PBR of each logical channel is applied only once in TTI.

First, the LCP is performed on resources of a CC #2. Available resources of the CC #2 are 1900 bytes. First, a first amount of data corresponding to a PBR, i.e., 500 bytes of an RB1, 300 bytes of an RB2, and 400 bytes of an RB3, is allocated in the descending order of priority of the RBs. The remaining resources are 700 bytes, and 700 bytes of the RB1 are allocated in the descending order of priority of the RBs.

Subsequent to the LCP of the CC #1, the LCP is performed on resources of a CC #3. 1000 bytes of the RB1 are allocated, and 400 bytes of the RB2 are allocated.

Subsequent to the LCP of the CC #3, the LCP of a CC #1 is performed. 600 bytes of the RB2 are allocated, and 300 bytes of the RB3 are allocated.

Consequently, the RLC PDU of the RB1 of 1200 bytes, the RLC PDU of the RB2 of 300 bytes, and the RLC PDU of the RB3 of 400 bytes are included in the MAC PDU of the CC #2. The RLC PDU of the RB1 of 1000 bytes and the RLC PDU of the RB2 of 400 bytes are included in the MAC PDU of the CC #3. The RLC PDU of the RB2 of 600 bytes and the RLC PDU of the RB3 of 300 bytes are included in the MAC PDU of the CC #1.

Figure 12:
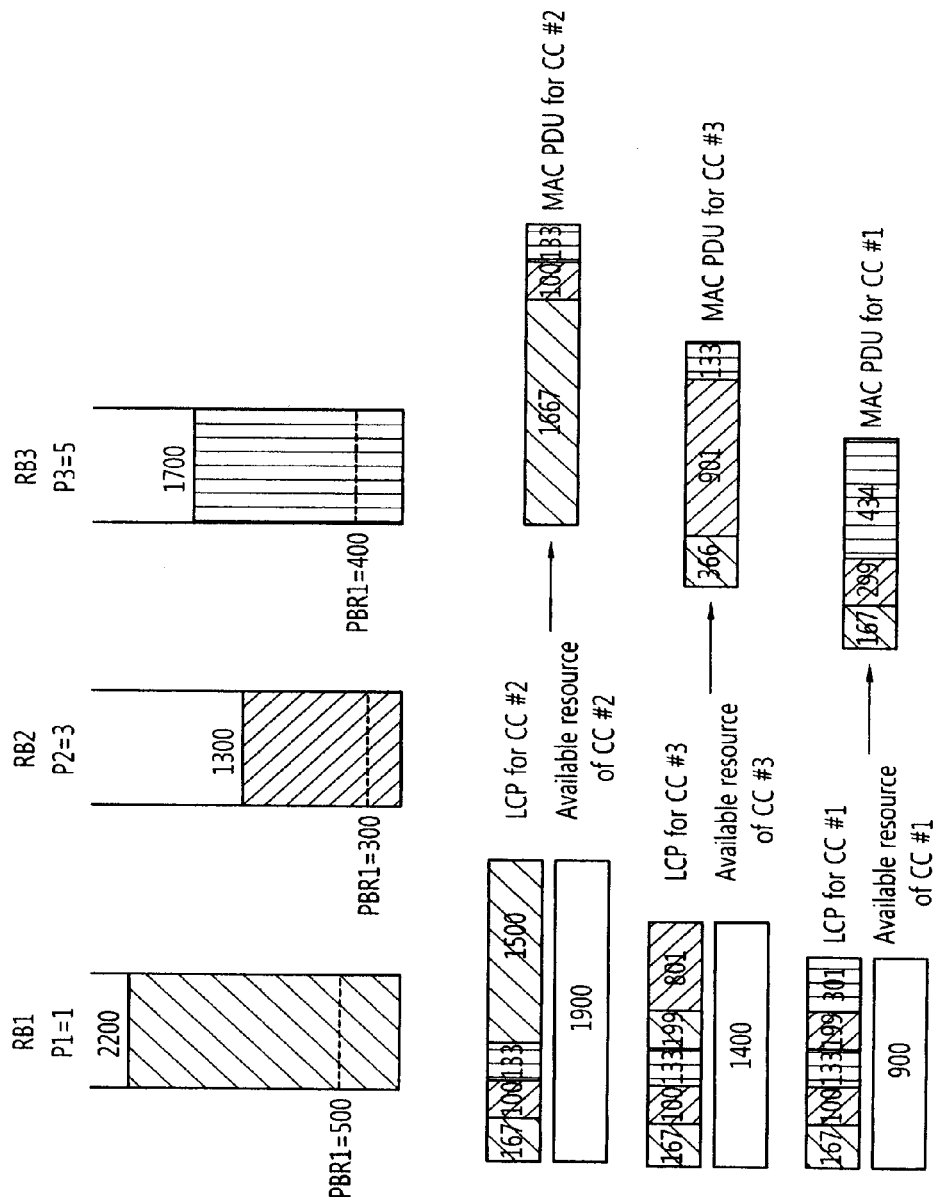
FIG. 12 shows LCP according to a third embodiment.

FIG. 12 shows LCP according to a third embodiment. The LCP is performed by the number of CCs. Since there are three CCs, the LCP is performed three times per TTI. Unlike in the embodiment of FIG. 11, a PBR of each logical channel is applied by being divided by the number of CCs.

For example, a PBR value of the RB1, i.e., 500, is divided by 3 to create three divided PBRs having a value of 167. A PBR value of the RB2, i.e., 300, is divided by 3 to create three divided PBRs having a value of 100. A PBR value of the RB3, i.e., 400, is divided by 3 to create three divided PBRs having a value of 133.

The LCP is applied to the available resources of a CC #2. First, a first amount of data corresponding to a divided PBR, i.e., 167 bytes of the RB1, 310 bytes of the RB2, and 133 bytes of the RB3, is allocated in the descending order of priority of the RBs. In addition, 1500 bytes of the RB1 are allocated to the remaining resources.

Then, the LCP is applied to the available resources of a CC #3. First, a first amount of data corresponding to a divided PBR, i.e., 167 bytes of the RB1, 310 bytes of the RB2, and 133 bytes of the RB3, is allocated in the descending order of priority of the RBs. In addition, 199 bytes of the RB1 and 801 bytes of the RB2 are allocated to the remaining resources.

Then, the LCP is applied to the available resources of a CC #1. First, a first amount of data corresponding to a divided PBR, i.e., 167 bytes of the RB1, 310 bytes of the RB2, and 133 bytes of the RB3, is allocated in the descending order of priority of the RBs. In addition, 199 bytes of the RB2 and 301 bytes of the RB3 are allocated to the remaining resources.

Consequently, the RLC PDU of the RB1 of 1667 bytes, the RLC PDU of the RB2 of 100 bytes, and the RLC PDU of the RB3 of 133 bytes are included in the MAC PDU of the CC #2. The RLC PDU of the RB1 of 366 bytes, the RLC PDU of the RB2 of 901 bytes, and the RLC PDU of the RB3 of 133 bytes are included in the MAC PDU of the CC #3. The RLC PDU of the RB2 of 167 bytes, the RLC PDU of the RB2 of 299 bytes, and the RLC PDU of the RB3 of 434 bytes are included in the MAC PDU of the CC #1.

An amount of data corresponding to the divided PBR of each RB is included in the MAC PDU of each CC.

Although resource allocation and/or LCP are applied in the order of CC #2->CC #3->CC #1 in the embodiments of FIG. 10 to FIG. 12, there is no restriction on the order of CCs. A transmitter can perform the LCP on a plurality of CCs randomly or according to a predetermined order.

However, since data corresponding to the PBR is transmitted through a first CC, i.e., the CC #2, in the embodiments of FIG. 10 and FIG. 11, if the CC #2 is a CC having the highest reliability, quality of service can be increased.

Figure 13:
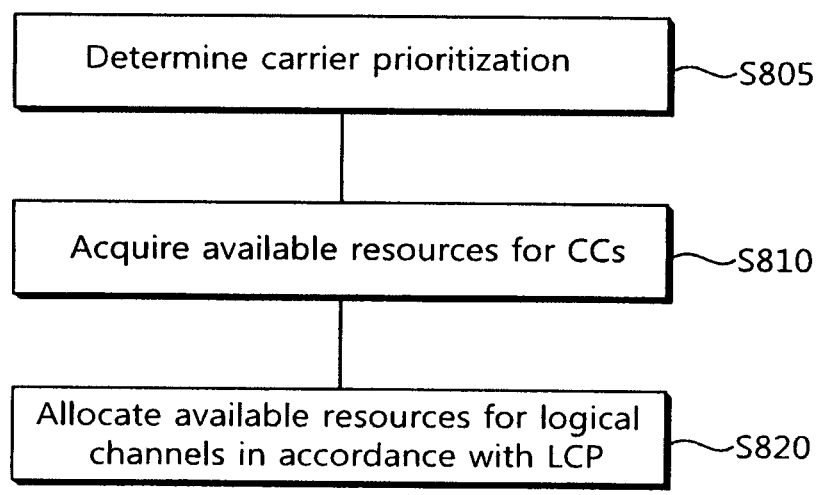
FIG. 13 is a flowchart showing a resource allocation method according to an embodiment of the present invention.

FIG. 13 is a flowchart showing a resource allocation method according to an embodiment of the present invention. Comparing with the embodiment of FIG. 9, carrier prioritization is applied.

Priority of each of CCs for performing LCP is determined (step S805). A plurality of available resources for the plurality of CCs is acquired (step S810). The plurality of available resources is allocated to the plurality of logical channel in accordance with the LCP (step S820).

The purpose of the carrier prioritization is to correctly calculate an RLC PDU size for each CC and to allocate a CC having higher priority to an RB having higher priority.

The carrier prioritization can be determined variously.

The carrier prioritization can be determined according to a configuration criterion. The configuration criterion may be predetermined or may be reported by a BS to a UE.

The configuration criterion may be at least one of channel quality, an available resource, and a carrier type.

The channel quality may include a reference signal received power (RSRP) and/or a reference signal received quality (RSRQ). The higher the channel quality of a CC, the higher the priority level of the CC.

A CC having more available resources can have a higher priority level.

The carrier type may include an LTE CC that guarantees compatibility with LTE and an LTE-A CC that does not guarantee compatibility with LTE. The LTE CC may have a higher priority level than the LTE-A CC, or the other way around is also possible.

Figure 14:
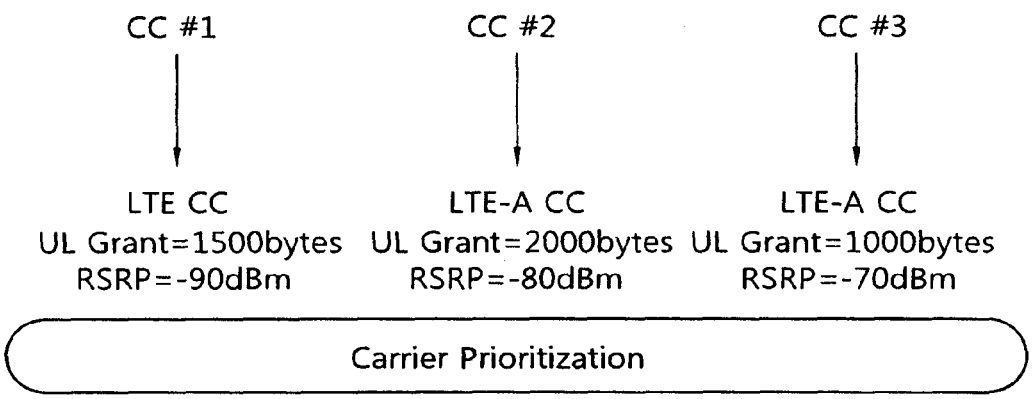
FIG. 14 shows an example of carrier prioritization.

FIG. 14 shows an example of carrier prioritization. When an RSRP is used as a criterion, a CC #3 has the highest priority level. When an available resource (or an uplink grant) is used as the criterion, a CC #2 has the highest priority level. When an LTE CC is used as the criterion, a CC #1 has the highest priority level. When an LTE-A CC is used as the criterion, the CC #2 or the CC #3 has the highest priority level.

According to the criterion, the carrier prioritization can lead to a different result.

A BS can report the carrier prioritization to a UE. The carrier prioritization can be transmitted using a cell-specific message or a UE-specific message. According to the cell-specific message, the carrier prioritization is common to UEs in a cell. According to the UE-specific message, the carrier prioritization can be given differently to each UE.

When the UE determines the carrier prioritization, the UE can apply LCP in the descending order of the carrier prioritization. In the embodiments of FIG. 10 to FIG. 12, the carrier prioritization is applied in the order of the CC #2, the CC #3, and the CC #1.

Figure 15:
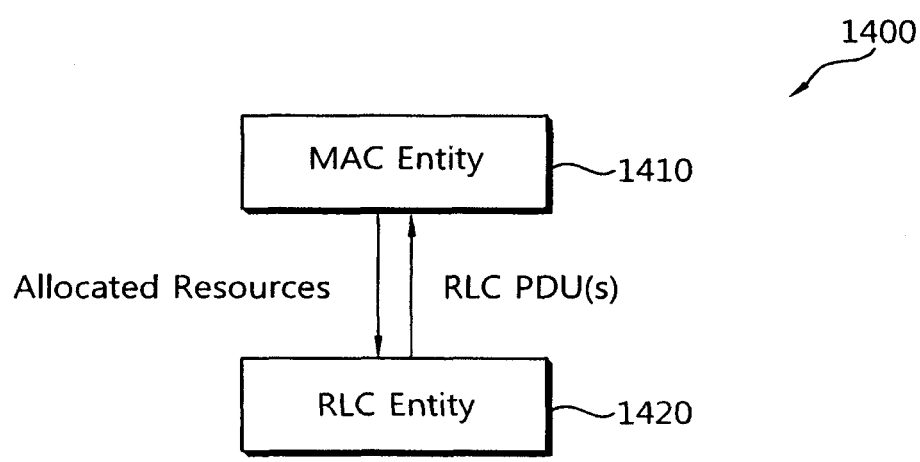
FIG. 15 is a block diagram showing a transmitter according to an embodiment of the present invention.

FIG. 15 is a block diagram showing a transmitter according to an embodiment of the present invention.

A transmitter 1400 includes a MAC entity 1410 and an RLC entity 1420. The MAC entity 1410 implements a MAC layer for a plurality of CCs. The RLC entity 1420 implements an RLC layer.

The MAC entity 1410 determines a resource allocated to each RB according to the aforementioned embodiments of FIG. 9 to FIG. 13, and transmits information regarding the allocated resource (or information for configuring an RLC PDU) to the RLC entity 1420. Further, the MAC entity 1410 configures a MAC PDU for each CC from the acquired RLC PDU, and transmits the MAC PDU to a receiver.

The RLC entity 1420 configures at least one RLC PDU for each RB on the basis of the resource allocated to each RB.

Figure 16:
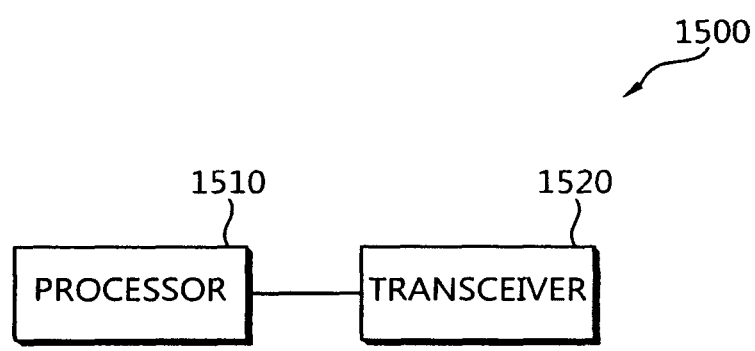
FIG. 16 is a block diagram showing a wireless apparatus according to an embodiment of the present invention.

FIG. 16 is a block diagram showing a wireless apparatus according to an embodiment of the present invention. A wireless apparatus 1500 may be a part of a UE.

The wireless apparatus 1500 includes a processor 1510 and a transceiver 1520.

The transceiver 1520 acquires an uplink grant from a BS, and transmits a plurality of MAC PDUs to the BS through a plurality of CCs. Further, the transceiver 1520 can receive LCP information (i.e., RB priority and a PBR) and/or carrier prioritization information from the BS.

The transceiver 1520 implements layers of a radio interface protocol, and implements a MAC layer and an RLC layer. The transceiver 1520 configures a MAC PDU for each CC according to the aforementioned embodiments of FIG. 9 to FIG. 13.

The processors may include application-specific integrated circuit (ASIC), other chipset, logic circuit and/or data processing device. When the embodiments are implemented in software, the techniques described herein can be implemented with modules (e.g., procedures, functions, and so on) that perform the functions described herein. The modules can be executed by processors.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of allocating resources for a plurality of logical channels in a wireless communication system, each of the logical channels having a corresponding priority, performed by a user equipment, the method comprising:
   receiving a plurality of uplink grants from a base station, the plurality of uplink grants corresponding to a plurality of data units, each of the plurality of the data units being transmitted in a corresponding one of a plurality of transport blocks in one Transmission Time Interval (TTI) via a plurality of uplink component carriers; and
   determining available resources of each of the plurality of uplink grants that correspond to the plurality of data units transmitted within one TTI via the plurality of uplink component carriers;
   allocating one or more resources, of the determined available resources, for each of the plurality of logical channels according to a first amount of data associated with each of the plurality of logical channels; and
   allocating any remaining resources, of the one or more resources, for each of the plurality of logical channels according to a second amount of data associated with each of the plurality of logical channels,
   wherein the allocation of the one or more resources is based on fee priorities associated with the plurality of logical channels, and
   wherein the allocating is applied to each of the plurality of uplink grants independently or to the sum of the plurality of uplink grants.

2. The method of claim 1, wherein the data units are Medium Access Control Protocol Data Units (MAC PDUs).

3. The method of claim 1, wherein the one or more resources are determined by using the plurality of uplink grants received from the base station.

4. The method of claim 1, wherein the first amount of data for each of the plurality of logical channels is based on a prioritized bit rate (PBR) for each of the plurality of logical channels.

5. The method of claim 1, wherein the second amount of data associated with each of the plurality of logical channels is additional data transmitted in addition to the first amount of data.

6. The method of claim 1, wherein the one or more resources are determined by summing available resources from the plurality of uplink grants corresponding to the plurality of data units that will be transmitted within the one TTI via the plurality of uplink component carriers.

7. The method of claim 1, wherein the remaining resources are allocated equally amongst two logical channels respectively when the two logical channels are configured with equal priority.

8. The method of claim 1, wherein the first amount of data associated with each of the plurality of logical channels is a guaranteed amount of data to be allocated for each of the plurality of logical channels.

9. A wireless apparatus comprising: a transceiver; and
   a processor operatively coupled to the transceiver, wherein the processor:
   allocates resources for a plurality of logical channels, each of the logical channels having a corresponding priority,
   controls the transceiver to receive a plurality of uplink grants from a base station, the plurality of uplink grants corresponding to a plurality of data units, each of the plurality of data units being transmitted in a corresponding one of a plurality of transport blocks in one Transmission Time Interval (TTI) via a plurality of uplink component carriers; and
   determines available resources of each of the plurality of uplink grants that correspond to the plurality of data units transmitted within one TTI via the plurality of unlink component carriers;
   allocates one or more resources, of the determined available resources, for each of the plurality of logical channels according to a first amount of data associated with each of the plurality of logical channels; and
   allocates any remaining resources, of the one or more resources, for each of the plurality of logical channels according to a second amount of data associated with each of the plurality of logical channels,
   wherein the allocation of the one or more resources is based on die priorities associated with the plurality of logical channels, and
   wherein the allocating is applied to each of the plurality of uplink grants independently or to the sum of the plurality of uplink grants.

10. The wireless apparatus of claim 9, wherein the data units are Medium Access Control Protocol Data Units (MAC PDUs).

11. The wireless apparatus of claim 9, wherein the one or more resources are determined by using the plurality of uplink grants received from the base station.

12. The wireless apparatus of claim 9, wherein the first amount of data for each of the plurality of logical channels is based on a prioritized bit rate (PBR) for each of the plurality of logical channels.

13. The wireless apparatus of claim 9, wherein the second amount of data associated with each of the plurality of logical channels is additional data transmitted in addition to the first amount of data.

14. The wireless apparatus of claim 9, wherein the one or more resources are determined by summing available resources from the plurality of uplink grants corresponding to the plurality of data units that will be transmitted within the one TTI via the plurality of uplink component carriers.

15. The wireless apparatus of claim 9, wherein the remaining resources are allocated equally amongst two logical channels respectively when the two logical channels are configured with equal priority.

16. The wireless apparatus of claim 9, wherein the first amount of data associated with each of the plurality of logical channels is a guaranteed amount of data to be allocated for each of the plurality of logical channels.

* * * * *

UNITED STATES PATENT AND TRADEMARK OFFICE
CERTIFICATE OF CORRECTION

| | | |
|---|---|---|
| PATENT NO. | : 9,839,043 B2 | Page 1 of 1 |
| APPLICATION NO. | : 14/668475 | |
| DATED | : December 5, 2017 | |
| INVENTOR(S) | : Seung June Yi et al. | |

It is certified that error appears in the above-identified patent and that said Letters Patent is hereby corrected as shown below:

In the Claims

Column 11, Line 63, change "based on fee priorities" to --based on priorities--.

Column 12, Line 53, change "based on die priorities" to --based on priorities--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*